Patented Aug. 7, 1945

2,381,506

UNITED STATES PATENT OFFICE 2,381,506

SOLVENT COMPOSITION

Clarence M. Loane, Hammond, Ind., assignor to Standard Oil Company, Chicago, Ill., a corporation of Indiana No Drawing. Application April 26, 1941, Serial No. 390,588

5 Claims. (Cl. 252—364)

This invention relates to synthetic chemical polymer products and to the use thereof. More particularly this invention is directed to the oxidation of low molecular weight olefin polymers and the use of the oxidation products as solvents.

The polymerization of monoolefinic hydrocarbons to hydrocarbons of higher molecular weight, thermally or, preferably, in the presence of catalysts, is well known in the art. Unsaturated products are obtained varying from simple dimers of the olefinic feed stock to polymers having molecular weights as high as 300,000 or more. The type of product obtained depends not only on the starting material employed but also on the catalyst, the temperature, pressure, the intimacy and time of contact, etc.

I have now discovered that desirable products of great utility can be obtained by the oxidation of relatively low molecular weight polymers of isomonoolefins, such as isobutylene, isoamylene and the like, and of the copolymers and cross polymers of these isoolefins with normal olefins. These low molecular weight polymers, the molecular weight of which can range from about 100 to about 800, are obtained by polymerizing in the liquid phase isoolefins, such as isobutylene or hydrocarbon mixtures containing the same, in the presence of a catalyst such as boron fluoride, aluminum chloride, zinc chloride, and other similar active halide catalysts of the Friedel-Crafts type, at a temperature of from about 0° F. to about 100° F., and preferably from about 20° F. to about 100° F. The polymers can also be obtained by the polymerization of these hydrocarbons in the presence of sulfuric acid, phosphoric acid, and various siliceous catalysts, such as fuller's earth or clays, which can be activated by treatment with mineral acid if desired.

It is an object of this invention to provide a new and improved solvent from polymers of the type described above. Another object of my invention is to provide a new and improved process for the production of hydrocarbon derivatives suitable as solvents. A further object of my invention is to provide hydrocarbon derivatives suitable for blending with hydrocarbon solvents, particularly petroleum solvents, for enhancing or increasing the solvent power thereof. Other objects and advantages will become apparent as the description of my invention proceeds.

Hydrocarbons have been employed as solvents in many industries, and for many substances. Some of their more prominent uses are in the varnish and paint industries, and in dry cleaning establishments. The hydrocarbon solvents also are used for lacquers, resins, fats, oils, greases, nitrocellulose, etc. They usually consist of special hydrocarbons, such as toluene, or special cuts or fractions from petroleum or coal tar distillation. The term "hydrocarbon solvents" as used herein refers to those hydrocarbons which are commonly used by those skilled in the art as solvents for organic compounds and which are considered as a class, separate and distinct from other classes of hydrocarbons such as lubricating oils, motor fuels and the like.

I have discovered that by subjecting the polymers to an oxidation treatment, as hereinafter described, valuable hydrocarbon derivatives, suitable as solvents or as blending agents for hydrocarbon solvents, such as those described above, are formed. Polymers per se can be oxidized or the polymers can be fractionated and the various fractions subsequently subjected to oxidation treatment. The total oxidized polymer can be used or it can be refined by treating with caustic or solvents, or can be separated into desired fractions by distillation.

In order to illustrate my invention I will describe it with reference to low molecular weight polymers obtained, for example, by the boron fluoride treatment of a butane-butylene fraction containing from about 10% to about 25% isobutylene, the remainder being principally butanes and normal butenes, which can suitably be obtained from the gases produced in the cracking of petroleum oils for the manufacture of gasoline.

Suitable polymers can be prepared by maintaining a hydrocarbon mixture containing isobutylene as above described under pressure sufficient to keep it in the liquid phase and cooled to a temperature, for example, of about 32° F. To this, boron fluoride in an amount of from about 0.1% to about 2%, based on the isobutylene content of the feed stock, is added with vigorous agitation. A rise in temperature due to the reaction will occur and this can be avoided at least in excessive amounts by means of efficient cooling. Under these conditions, the isobutylene is polymerized to form a mixture of polymers of various molecular weights. The polymer mixture, together with any unreacted hydrocarbons such as the butanes and normal butenes, is neutralized and washed free of acidic substances arising from the catalyst. The liquid polymer layer is separated and freed of unreacted light hydrocarbons. The product thus obtained varies in consistency from a light liquid to a viscous oily material, depending upon the temperature of the reaction and the efficiency of the cooling, and contains polymers having molecular weights ranging from about 100 to about 1500. For the purposes of the present invention, I prefer to use those polymers having molecular weights ranging from about 100 to about 800. A preferred polymer fraction will contain polymers having a molecular weight lying between about 112 and 400.

A polymer fraction of the preferred molecular weight can be separated by distillation from the polymers of higher molecular weight produced during the polymerization process described, and the entire fraction oxidized as such; or the polymers can be fractionated into fractions of increasing molecular weight, e. g., a dimer fraction, a trimer fraction, etc., and each fraction oxidized separately. The low molecular weight polymers of isobutylene have the following approximate boiling points:

| Polymer | Boiling point, °F. |
|---|---|
| Dimer | 215. |
| Trimer | 350. |
| Tetramer | 475. |
| Pentamer | 570 (300° at 7 mm.). |
| Hexamer | 635 (320° at 2.5 mm.). |
| Heptamer | 700 (365° at 2 mm.). |

While the oxidation of low molecular weight polymers of the type described can be carried out by any suitable method, the methods hereinafter described are considered particularly desirable.

An isobutylene dimer prepared as described above was oxidized in an autoclave with oxygen under pressure. A sample was placed in the autoclave and oxygen used to flush out the vapor space. Oxygen was then introduced to a pressure of 110 pounds per square inch and the bomb heated to 210° F. by means of a steam jacket. The pressure averaged approximately 90 pounds per square inch for fifty hours, additional oxygen being added as required to maintain the pressure. The original sample of dimer had an initial boiling point of 140° F., a 10% boiling point of 208° F., a 90% boiling point of 230° F., a maximum boiling point of 260° F., a bromine number of 149, and a specific gravity of 0.728. The product from the oxidation reaction was fractionated into ten cuts having boiling ranges and bromine numbers as follows:

| Cut number | Boiling range, °F. | Bromine number |
|---|---|---|
| 1 | Less than 135 | |
| 2 | 135–195 | 112 |
| 3 | 195–202 | 14 |
| 4 | 202–220 | 134 |
| 5 | 220–227 | 130 |
| 6 | 227–230 | 133 |
| 7 | 230–262 | 95 |
| 8 | 262–270 | 16 |
| 9 | 270–284 | 57 |
| 10 (residue) | 284 | 47 |

It is obvious that according to the bromine numbers, cuts 3, 7, 8, 9 and 10 underwent considerable conversion.

"Mixed aniline points" were determined on cuts 7, 8, 9 and 10 by mixing one volume of the sample with one volume of precipitation naphtha and two volumes of aniline. The mixture was then shaken vigorously in a water bath while heating and the temperature recorded at which the two liquid phases merged into one continuous phase. This temperature at which the two liquid phases become homogeneous in appearance is called the "mixed aniline point" and is indicative of the solvent power of the compound. The lower the aniline point, the greater the solvent power of the hydrocarbon compound. This general method of determining the solvent power of chemical compounds is well-known in the paint and lacquer arts and is discussed in the Proceedings of the American Society for Testing Materials in Volume 40. The modification described above was used since, by employing equal volumes of aniline and sample, the aniline point is often difficult to obtain within a reasonable temperature range, whereas by mixing the sample with precipitation naphtha, an equally acceptable comparison could be obtained at a reasonable temperature.

The following mixed aniline points were obtained. The mixed aniline point of the original dimer fraction is also given, as well as that for toluene, a well-known solvent.

| Cut number | Mixed aniline point, °F. |
|---|---|
| 7 | 82 |
| 8 | 10 |
| 9 | 24 |
| 10 | 41 |
| Original dimer fraction | 121 |
| Toluene (C. P.) | 31 |

The mixed aniline points show that cuts 8, 9 and 10 in particular are considerably changed from the original dimers in solvent power and are excellent for use as lacquer solvents, etc. Cut 3, which also showed an excellent bromine number, is not included, since the sample contained a part of the water by-product from the oxidation reaction, which of course masks the true aniline point.

A trimer fraction from the polymerization of isobutylene as described above, having a boiling range of from about 325° F. to about 382° F. was oxidized in the absence of any catalyst at steam bath temperature (about 200° F. measured in the oil) while bubbling air through it. After an oxidation period of about 72 hours, the oxidized product was steam distilled from the reaction mass and a fraction having a boiling range of from about 298 to 352° F. at a pressure of 3.0 to 3.5 mm. was separated. The separated portion had an aniline point of below −30° F. as compared with an aniline point of 135° F. for an equivalent sample of unoxidized polymer.

In another experiment a trimer cut from the polymerization of butylenes using phosphoric acid on kieselguhr as a catalyst was employed. A hydrocarbon mixture containing from about 10% to about 25% isobutylene in addition to butanes and normal butenes was contacted with phosphoric acid on kieselguhr at a temperature of about 325° F. and a pressure of about 650 pounds per square inch. The polymer mixture of dimers, trimers, etc. was separated from the unreacted light hydrocarbons and a fraction having a boiling range of from 336° F. to 490° F. fractionated therefrom which contained 90% or more of butylene trimer. One portion of the above trimer was oxidized for 96 hours at 248° F. with air, utilizing a partial reflux to prevent loss of material. The resulting product had an aniline point of 26° F. Another portion of the trimer was oxidized for 96 hours at 248° F. in the presence of 6% calcium oxide using air as the oxidizing medium and employing a partial reflux to prevent loss of material. The product from this oxidation had an aniline point of 3° F. The original trimer had an aniline point of 142° F. which shows conclusively the improvement in solvent powers obtained by the oxidation treatment of polymers.

Generally speaking, the oxidation of low molecular weight polymers such as those described can be carried out in the liquid phase by bubbling air and/or oxygen or gases containing free oxygen through the polymer at a temperature within the range of from about 100° F. to about 400° F., preferably from about 180° F. to 300° F. The oxidation can be carried out in the presence or absence of oxidation catalysts. Oxidation catalysts employed can be either dissolved in or suspended in the polymer. Suitable catalysts include the oxides of metals which exist in more than one valence, such as for example, the oxides of vanadium, manganese, chromium, copper, iron, cobalt and the like. In place of the oxides the salts of such metals, and preferably the fatty acid salts, can be employed. Such catalysts include the stearates, palmitates, oleates, and linoleates of the above-mentioned metals. When the oxidation is carried out in the presence of the oxides of these metals, the metal soaps of the acid oxidation product of low molecular weight polymers are formed, so that it may become necessary to neutralize the products to obtain products of desirable solvent power.

The low molecular weight polymers and copolymers can also be oxidized by treatment with ozone followed by hydrolysis, i. e., the polymers are treated with oxygen and/or air which has previously been subjected to silent electrical discharge to produce ozone. The ozonation should be conducted preferably at a low temperature, within the range of from about 70° F. to about −40° F., for example. The ozonides thus formed are subjected to hydrolysis by agitating the ozonized polymers with boiling water. Catalysts, such as zinc duct and a tract of silver salt, can be added to the mixture to promote the addition of oxygen. In addition an oxidation inhibitor, such as for example hydroquinone, can be added to prevent the oxidation from going too far. Acids formed can be removed by a neutralization step followed by distillation, if desired.

Low molecular weight polymers can also be converted to the desired product by the use of oxidation agents such as potassium permanganate, potassium chromate, and the like, usually employed in aqueous solutions. When using aqueous solutions, however, it is desirable to have emulsifying agents present to insure complete contact of the polymers and the oxidizing agent.

Increase in the total yield of oxidized olefin polymers can be obtained by the fractionation of oxidized products from unconverted polymers and the recycle of the unchanged olefinic hydrocarbons to the oxidation step.

Although I have described my invention by illustrations involving batch operations, it will be obvious that a continuous operation will be preferable for commercial application, and that a continuous injection of hydrocarbons and oxygen with subsequent recovery of the desired product can be carried out in any well-known type of apparatus.

These oxidized polymers can be used as such for solvents, but since these products possess solvent power in many cases greater than that found suitable in the lacquer industry, as exemplified by toluene, the oxidized products can be used mixed with unconverted polymers, or can be blended with solvent naphthas and narrow fractions from petroleum oils or coal tar products having fairly good solvent powers in order to increase the solvent action of the total mixture. For example, a naphtha having a boiling range of from about 275° F. to about 375° F. and an aniline point of about 140° F. was blended in equal proportions with the products from the oxidation under pressure of a dimer cut to produce suitable solvents having an aniline point of 10° F.

The term "oxidized polymer" as used herein and in the appended claims means a polymer having oxygen combined therewith. Similarly, the term "oxidation" means the combining of oxygen with the polymer. The term "low molecular weight polymer" as used herein and in the claims means polymers of isoolefins, such as isobutylene, and the copolymers of normal olefins and isoolefins, such as normal butylene and isobutylene, having molecular weights less than 800.

Although my invention has been illustrated by various specific examples, it should be understood that these are by way of illustration and not by way of limitation, the scope of the invention being defined by the appended claims.

I claim:

1. A solvent composition comprising approximately 50% of a naphtha boiling within the approximate range of 275° F. and 375° F. and having an aniline point of about 140° F., and approximately 50% of an oxidized dimer of isobutylene, said composition having an aniline point of about 10° F.

2. A solvent composition consisting essentially of a solvent naphtha boiling within the approximate range of 275° F. to 375° F. and having an aniline point of approximately 140° F., and an approximately equal amount of oxidized low molecular weight iso-monoolefin polymers, said polymers prior to oxidation having a molecular weight within the approximate range of 100 to 800.

3. A solvent composition consisting essentially of a solvent naphtha boiling within the approximate range of 275° F. to 375° F. and having an aniline point of approximately 140° F., and an approximately equal amount of oxidized low molecular weight iso-monoolefin polymers, said polymers prior to oxidation having a molecular weight within the approximate range of 112 to 400.

4. A solvent composition consisting essentially of a solvent naphtha boiling within the approximate range of 275° F. to 375° F. and having an aniline point of approximately 140° F., and an approximately equal amount of oxidized low molecular weight iso-butylene polymers, said polymers prior to oxidation having a molecular weight within the approximate range of 100 to 800.

5. A solvent composition consisting essentially of a solvent naphtha boiling within the approximate range of 275° F. to 375° F., and having an aniline point of approximately 140° F. and an approximately equal amount of oxidized iso-butylene dimer.

CLARENCE M. LOANE.